Feb. 14, 1950   J. A. DAVIES   2,497,588
METHOD OF REFINING OIL WITH A SELECTIVE SOLVENT
Filed Oct. 7, 1947
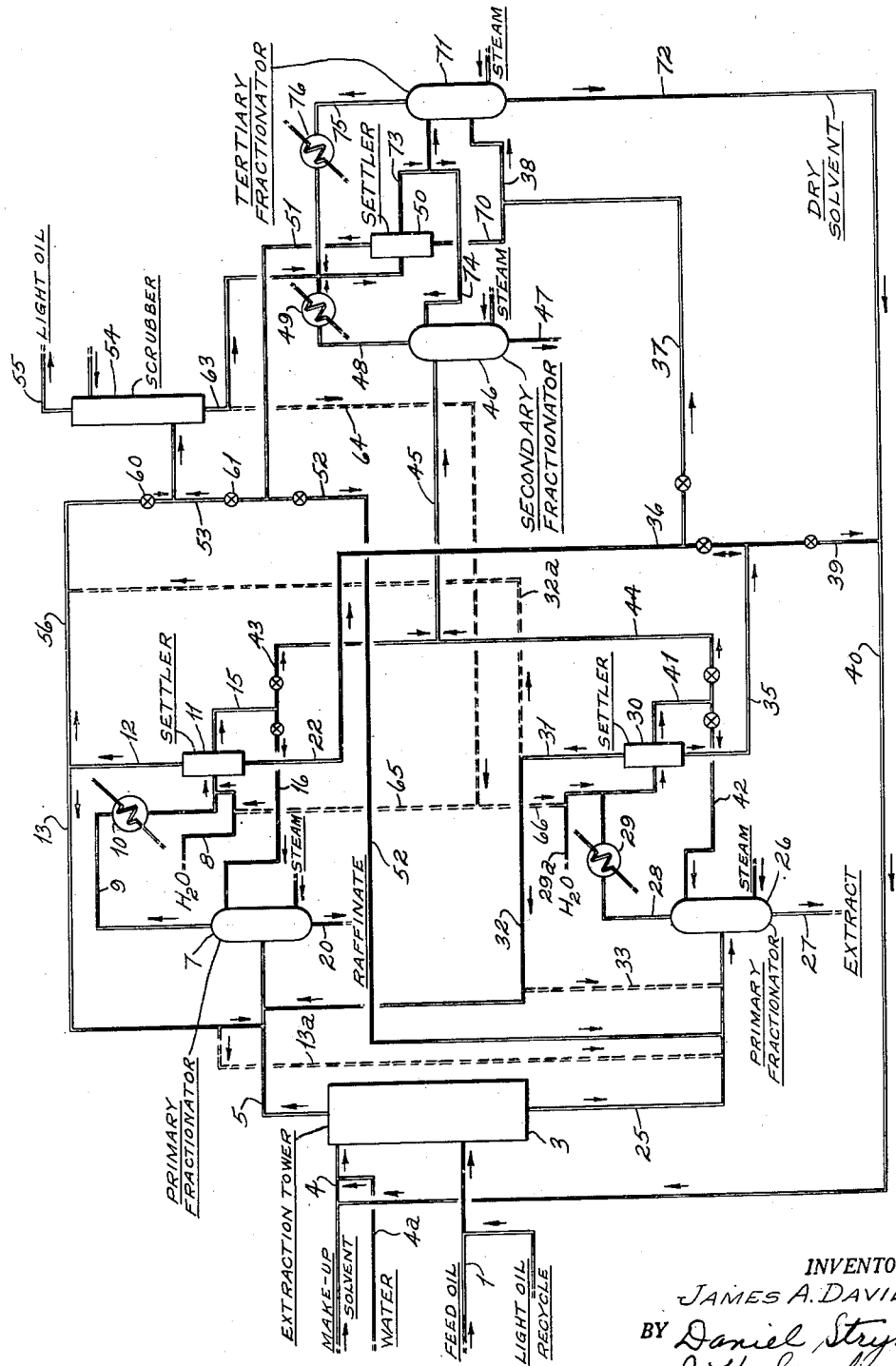
INVENTOR.
JAMES A. DAVIES
BY Daniel Stryker
J. H. Grahame
ATTORNEYS Patented Feb. 14, 1950

2,497,588

UNITED STATES PATENT OFFICE 2,497,588

METHOD OF REFINING OIL WITH A SELECTIVE SOLVENT

James A. Davies, Scarsdale, N. Y., assignor to The Texas Company, New York, N. Y., a corporation of Delaware Application October 7, 1947, Serial No. 778,369

17 Claims. (Cl. 196—14.48)

This invention relates to a method of effecting extraction of oil with a solvent liquid which is at least partially miscible with water at ordinary temperatures and particularly relates to the extraction of oil containing a minor proportion of constituents having true boiling points in the range of the solvent boiling temperature and below.

In accordance with the invention, a feed oil, such as kerosine or low boiling gas oil, is extracted with a selective solvent such as furfural and under conditions effective to form extract and raffinate phases respectively. The raffinate phase comprises non-aromatic or relatively insoluble constituents of the oil mixed with a small proportion of the solvent and water. The extract comprises the relatively aromatic and more soluble constituents of the oil dissolved in the main body of aqueous solvent.

The extract and raffinate phases are separately subjected to fractional distillation, the distillation being azeotropic or partially azeotropic in character, so as to strip the solvent completely or substantially completely from the oil while avoiding excessive carryover of low boiling constituents of the oil in the distillates. The resulting distillates are separately condensed and separately subjected to settling in the presence of water with the formation of oil-rich, water-rich, and solvent-rich liquid layers respectively. Liquid streams are continuously withdrawn from these separate liquid layers for further treatment.

The oil-rich liquids derived from both the extract and raffinate phases are preferably recycled at least in part to the raffinate phase fractionating zone, although they may be recycled to the extract phase fractionating zone in some cases. One purpose of such recycling is to reduce the net production of such oils. A substantial proportion of the recycled material is thus recovered in the raffinate and extract oil products.

The water-rich liquid is recycled in part to the fractionating zone from which it is derived, while the remainder is passed to a secondary fractionating zone for recovery of solvent and elimination of water. The solvent-rich liquids are passed to a tertiary fractionating zone to dry the solvent. Provision may be made for recycling a portion of the solvent-rich liquid directly to the extraction zone to which is also returned the dried solvent. The portion recycled to the extraction zone preferably should come from the settling zone for the extraction phase. The proportions of solvent-rich liquid recycled and passed to the tertiary fractionating zone are correlated to control the water or oil content of the solvent in the extraction zone. This water content is maintained not in excess of that required to saturate the solvent, and it is also anticipated that the solvent extraction may be carried out with substantially dry solvent. In the event it is preferable to maintain the water and oil content simultaneously in the solvent, it will be necessary to introduce water into the system at a point in advance of the extraction tower. These secondary and tertiary fractionating operations are likewise operated so as to produce distillates which, upon settling in the presence of each other, separate into secondary oil-rich, water-rich and solvent-rich layers. The oil-rich layer is continuously withdrawn, and, for the most part, recycled to the primary extract phase fractionating zone. The portion not recycled is treated to remove residual solvent.

The secondary solvent-rich phase in advantageously passed to the tertiary fractionating zone wherein water and some oil is stripped from the solvent, the resulting recovered dry solvent being recycled for reuse. The secondary water-rich liquid is recycled as reflux to both the secondary and tertiary fractionating zones.

As previously indicated, the invention has application to the solvent refining of a feed oil containing a small proportion of constituents whose true boiling point is in the range of the solvent boiling temperature and below. For example, the feed oil may comprise a gas oil such as derived from thermal or catalytic cracking and having an A. S. T. M. boiling range of about 350° to 700° F. The invention contemplates a method of extracting such oil with a relatively high boiling organic solvent of the type such as furfural. The main advantage of the invention is to obtain a recycle solvent that contains only a small portion of oil with no build up of light oil. Another advantage of the process of this invention is that it eliminates the necessity for a multistage flashing system for the recovery of solvent from the extract and raffinate phases. It reduces the amount of steam stripping involved in the more conventional methods of recovering solvent from oil mixtures and also avoids the use of sub-atmospheric pressures.

Under the conditions of operation contemplated by the invention, the solvent is heated only to relatively low temperatures, and, therefore, is less subject to deterioration.

In order to describe the invention in more detail, reference will now be made to the accompanying drawing comprising a flow diagram of the process as applied to the treatment of a gas oil derived from the catalytic cracking of petroleum oil for the production of Diesel fuel. The feed gas oil has an A. P. I. gravity of about 29 and a cetane number of about 32. It has an A. S. T. M. boiling range as follows:

| | °F. |
|---|---|
| I. B. P. | 430 |
| 10% | 470 |
| 20% | 480 |

|     | °F. |
| --- | --- |
| 50% | 500 |
| 90% | 560 |
| E. P. | 620 |

As indicated in the drawing, the feed oil is produced from a source not shown through a pipe 1, after such heating as may be necessary, to the lower portion of a primary extraction tower 3 of conventional type.

The feed oil rises through the packing of the tower 3 countercurrently to a stream of solvent liquid introduced to the upper portion of the tower through a pipe 4 to which reference will be made later. The solvent comprises furfural and may contain small amounts of water and oil as a result of previous use in the process. For example, it may contain about 3% water and about 10% oil by volume. On the other hand, the solvent may be substantially free from water and oil. The solvent is introduced to the tower in the proportion of about 1 volume of solvent to 2 volumes of feed oil. The temperature of the entering streams of oil and solvent are regulated, so that the temperature at the bottom of the tower 3 is maintained at about 100° F. while the temperature at the top is maintained at about 150° F.

Under these conditions, extract and raffinate phases form. The raffinate phase comprises oil of about 45 to 60 cetane number and amounting to from 60 to 80% by volume of the feed oil. The raffinate oil in which is dissolved a small portion of the solvent liquid is continuously removed from the tower through a pipe 5. It is then introduced to a raffinate oil stripper 7 wherein solvent is distilled from the raffinate oil. The stripper may be provided with a reboiling element, and means may be provided for the introduction of open steam to the lower portion of the stripper.

The resulting distillate comprises a mixture of furfural and water vapor and oil vapor, the latter amounting to about 5 to 10% basis the raffinate oil. This distillate is removed through a pipe 9 and cooler 10 wherein it is condensed and passed to a settling chamber 11. In this chamber, separation into oil-rich, water-rich and solvent-rich primary layers, respectively, occurs. In the event open steam is not used in stripper 7, water can be introduced through pipe 8 and mixed with the condensate. This water is preferably recycled from a subsequent point in the system as will be described later. The settling is effected in the presence of sufficient water to cause separation of the bulk of the solvent from the oil.

The composition of the oil-rich layer, and the character of the oil are as follows:

Composition:
| Per cent Oil | 93.9 |
| --- | --- |
| Per cent Solvent | 6.0 |
| Per cent Water | 0.1 |

Character of oil:
| A. P. I. Gravity | 40 |
| --- | --- |
| Refractive Index | 1.46 |

ATSM Distillation:
| I. B. P. | 250 |
| --- | --- |
| 10% | 320 |
| 50% | 410 |
| 90% | 450 |
| E. P | 500 |

This oil layer is continuously drawn off through pipe 12, and a portion of it is recycled through pipe 13 to the feed inlet of the stripper 7. The amount so recycled is in the proportion of about 0.05 to 0.10 volume per volume of raffinate oil entering the stripper.

The water-rich liquid collecting in the central portion of the settler 11 is drawn off continuously through a pipe 15 and recycled in part through pipe 16 to the stripper 7 as reflux. A portion may be introduced as vapor to the lower section of the stripper 7 through branch pipe or pipes and exchanger not shown.

The amount of water or water-rich liquid introduced to the stripper 7 is sufficient to maintain the temperature at the top of the stripper substantially below the boiling temperature of the solvent. Thus, when furfural is the solvent being used, it is desired to maintain the temperature at the top of the stripper within the range of about 210 to 300° F. The temperature at the bottom of the tower is maintained sufficiently high to distill all or substantially all of the solvent from the raffinate oil, the solvent-free oil being discharged through pipe 20.

The water-rich liquid drawn off through pipe 15 contains about 10% furfural and about 1% or less of oil.

The solvent-rich liquid layer accumulating in the bottom of the settling chamber 11 is continuously removed therefrom through pipe 22 and returned to the extraction tower 3 or to the tertiary fractionating zone as will be mentioned later. It contains about 85% to 90% furfural saturated with water and containing about 10 to 15% oil.

The extract phase formed in the extraction zone 3 is continuously drawn off therefrom through pipe 25 and conducted to the intermediate portion of an extract fractionating tower 26 which operates in a manner similar to that of tower 7. Solvent-free extract oil is discharged through pipe 27, and this oil is characterized by having an A. P. I. gravity of 10 to 12 and a cetane number of about 4 to 10.

Distillate comprising furfural, water, and a small proportion of oil is removed through pipe 28 and condenser 29 from which the resulting condensate is discharged into a settling chamber 30. If necessary, water may be added from pipe 29A to facilitate phase separation in chamber 30. In this chamber, the condensate separates into oil-rich, water-rich, and solvent-rich primary layers, respectively. The oil-rich liquid is withdrawn continuously through pipe 31 and preferably conducted through pipe 32 and introduced to the raffinate phase fractionator 7. If desired, provision may be made for recycling all or a portion of this oil-rich liquid from pipe 31 through a branch pipe 33 to the fractionator 26. Provision may also be made for passing it through pipe 32A to the scrubber 54 referred to later.

The solvent-rich liquid cooling in the bottom of the chamber 30 is continuously drawn off through pipe 35 and conducted through pipe 36 along with the solvent-rich liquid from pipe 22 to pipes 37 and 38 leading to a tertiary fractionator referred to later. A portion of the solvent-rich liquid may be diverted through pipes 39 and 40 for return to the extraction tower 3.

The water-rich liquid accumulating in the intermediate portion of the chamber 30 is continuously drawn off through pipe 41, and a portion thereof diverted through pipe 42 for return to the fractionator 26. Some of this recycled liquid may be injected to the lower portion of the tower 26 as in the case of tower 7. The temperature at the top of the fractionator 26 is maintained substantially below the boiling temperature of furfural or below the boiling temperature of the solvent used in the system. Generally speaking, it is desirable to maintain this temperature in the range of about 25 to 100° lower than the boiling temperature of the solvent in both fractionators 7 and 26.

The non-recycled portions of the water-rich liquid are conducted through pipes 43 and 44, respectively, to a common pipe 45 leading to the upper portion of a secondary fractionator 46 wherein azeotropic or partial azeotropic distillation of furfural and retained oil from the bulk of the associated water occurs. The mixture entering the fractionator through pipe 45, as previously indicated, contains about 90% water and 1 or 2% oil, the rest being solvent. Steam is introduced to the lower section of the fractionator 46, while water substantially free from solvent is discharged through pipe 47.

The resulting distillate enriched in furfural is removed through pipe 48 and condenser 49 from which it is passed to a secondary settling chamber 50. Here, oil-rich, water-rich, and solvent-rich secondary layers form. The oil-rich liquid is continuously drawn from the top of the settling chamber through pipe 51, and preferably is conducted mainly through pipe 52 for recycling to the fractionator 26. The non-recycled portion is conducted through pipe 53 to the lower portion of a wash tower or scrubber 54 wherein it is subjected to countercurrent contact with a stream of water at a temperature of about 100 to 150° F. and atmospheric pressure, so that the small amount of residual solvent liquid is dissolved in the water. The resulting solvent-free oil of relatively low boiling range is discharged through pipe 55.

The portion of the primary oil-rich liquid from settler 11 which is not recycled to the fractionator 7 may be passed through pipe 56 to scrubber 54. It is preferable to charge the oils from pipes 56 and 53 separately to the scrubber although they may be charged simultaneously. For separate charging, block valves 60 and 61 are provided. When valve 60 is closed, all of the primary oil-rich liquid flowing through pipe 12 is recycled to the fractionator 7 or to fractionator 26 through pipe 13A, if desired. When valve 61 is closed, all of the secondary oil-rich liquid flows through pipe 52. Recycling of the total streams for substantial periods of time is possible, because the net production of light oil is quite small.

The quality of the oil in streams 53 and 56 will be different which is the reason for running them separately to scrubber 54. The following tabulation affords a comparison of the two oils:

|  | From Settler 11 | From Settler 50 |
|---|---|---|
| A. P. I. Gravity | 40 | 25 |
| Refractive Index | 1.46 | 1.51 |
| A. S. T. M. Distillation: |  |  |
| I. B. P | 250 | 250 |
| 10% | 320 | 320 |
| 50% | 410 | 410 |
| 90% | 450 | 450 |
| E. P | 500 | 500 |

The resulting solution of residual solvent in water is drawn off through pipe 63 and conducted to settler 50. A portion thereof may be diverted through pipe 64 and branch pipes 65 and 66 for addition to the condensates flowing into settlers 11 and 30.

The solvent liquid accumulating in the bottom of the settling chamber 50 is drawn off through pipe 70 and pipe 38 for introduction to the tertiary fractionator 71. In the tertiary fractionator, the feed mixture is subjected to distillation with the aid of steam, and under temperature conditions so that water is distilled from the solvent. The resulting solvent liquid is discharged from the bottom of fractionator 71 through pipe 72 for return to the extraction tower 3. The distillate of water vapor containing a small amount of solvent and oil is passed through pipe 75 and condenser 76 to the settler 50.

Water-rich liquid accumulating in the intermediate portion of chamber 50 is drawn off through pipe 73 and, in part, conducted to the upper portion of the fractionator 71 wherein it is used as reflux liquid to maintain the temperature at the top of the fractionator at about 250 to 300° F. The remainder of the water-rich liquid going through pipe 73 is diverted through pipe 74 and introduced as reflux liquid in the secondary fractionator 46 so as to maintain the temperature at the top of this fractionator in the range of about 210 to 250° F. If desired, fractionator 46 may be refluxed with at least a portion of the water furfural mixture discharged from the wash tower 54.

If desired, oil-rich liquids from settlers 11, 30 and 50 may be recycled in minor part to the extraction tower 3 as light oil recycle.

Provision may be made for adding make-up water through a pipe 4A to compensate for excess water removal in the tertiary fractionator 71, which excess removal may occur as a result of removing the desired amount of residual light oil from the solvent.

It will be understood that the temperatures and solvent dosages, etc., previously mentioned may vary depending upon the nature of the feed oil, the degree of solvent fractionation desired and the nature of the solvent employed.

The drawing is merely indicative of the particular apparatus and equipment used. No attempt has been made to describe or show heaters, heat exchangers, reboilers, coolers, etc., since such apparatus is conventional. For example, all fractionating columns may be provided with reboiler sections as well as with means for introducing open steam to aid in the fractionation or stripping.

While the treatment of gas oil by catalytic cracking has been specifically referred to in connection with the drawing, nevertheless, it should be understood that the process is applicable to the treatment of other types of gas oils and also to the treatment of kerosine containing small amounts of constituents having a true boiling point lower than that of the solvent used. In general, it has application to the treatment of hydrocarbon mixtures having an A. S. T. M. boiling range of about 350 to 700° F. It is also contemplated that it has application to the treatment of oils derived from animal and vegetable sources. Specific conditions of temperature and solvent dosage may vary from those specifically mentioned, depending on the character of the feed oil undergoing treatment and the degree of fractional separation desired in the extraction tower 3.

The invention is particularly concerned with the use of relatively high boiling organic solvent liquids which are miscible, at least to some extent with water, and with which constituents of the oil feed in the presence of water form azeotropes.

Selective solvents other than furfural may be used. They may include other derivatives of the furan group and other aldehydes such as benzaldehyde, nitrobenzene and ketones, etc.

Obviously, many modifications and variations of the invention as above set forth may be made without departing from the spirit and scope thereof, and therefore only such limitations should be imposed as are indicated in the appended claims.

I claim:

1. In the solvent separation of feed oil containing at least a small proportion of constituents having true boiling points in the range of the solvent boiling temperature and below wherein the feed oil is subjected to contact in an extraction zone with an organic solvent liquid partially miscible with water, extract and raffinate phases are formed, and separately removed from the extraction zone, the steps comprising distilling from at least one of said phases in a primary fractionating zone a distillate of solvent vapor containing small amounts of oil and water and leaving a liquid residue of oil substantially free from solvent, discharging said solvent-free oil, condensing said distillate, subjecting resulting condensate to settling in the presence of water in a primary settling zone, forming in said primary settling zone oil-rich, water-rich and solvent-rich liquid layers respectively, separately withdrawing liquid from each of said primary layers, recycling a portion of withdrawn primary water-rich liquid to said primary fractionating zone, passing another portion of withdrawn primary water-rich liquid to a secondary fractionating zone, passing withdrawn primary solvent-rich liquid to a tertiary fractionating zone, distilling from said secondary and tertiary fractionating zones distillates containing solvent, water and oil, discharging water as a residual fraction from said secondary fractionating zone, withdrawing substantially dry solvent as a residual liquid fraction from said tertiary fractionating zone, recycling withdrawn dry solvent to said extraction zone, condensing said secondary and tertiary distillates, subjecting resulting secondary and tertiary condensates in the presence of each other to settling in a secondary settling zone, forming in said secondary settling zone secondary oil-rich, water-rich and solvent-rich liquid layers respectively, separately withdrawing said secondary layers, recovering oil from withdrawn secondary oil-rich liquid, passing withdrawn secondary solvent-rich liquid to said tertiary fractionating zone, and passing withdrawn secondary water-rich liquid to both said secondary and tertiary fractionating zones.

2. The method according to claim 1 in which secondary oil-rich liquid and primary oil-rich liquid are, at least in part, washed with water to extract residual solvent therefrom, and the resulting extract solution of solvent and water is passed to said secondary settling zone.

3. The method according to claim 1 in which secondary oil-rich liquid and primary oil-rich liquid are washed with water to extract residual solvent therefrom, and the resulting extract solution of solvent and water is passed at least in part to said primary settling zone.

4. The method according to claim 1 in which a portion of primary solvent-rich liquid is passed to said tertiary fractionating zone, another portion recycled to the extraction zone, and the relative portions correlated so as to maintain a predetermined concentration of water in the solvent in the extraction zone.

5. The method according to claim 1 in which at least a portion of primary oil-rich liquid is recycled to said primary fractionating zone.

6. In the solvent separation of feed oil containing at least a small proportion of constituents having true boiling points in the range of the solvent boiling temperature and below wherein the feed oil is subjected to contact in an extraction zone with an organic solvent liquid partially miscible with water, extract and raffinate phases are formed, and separately removed from the extraction zone, the steps comprising separately distilling from said phases in primary fractionating zones distillates of solvent vapor containing small amounts of oil and leaving liquid residues of oil substantially free from solvent, discharging said solvent-free oils, condensing said distillates, subjecting resulting condensates separately to settling in the presence of water in primary settling zones, forming in each primary settling zone oil-rich, water-rich and solvent-rich liquid layers respectively, withdrawing liquid from each of said primary layers, recycling a portion of withdrawn primary water-rich liquid to its respective primary fractionating zone, passing the remainder of said primary water-rich liquids to a secondary fractionating zone, passing withdrawn primary solvent-rich liquid to a tertiary fractionating zone, distilling from said secondary and tertiary fractionating zones distillates containing solvent, water and oil, discharging substantially solvent-free and oil-free water as a residual fraction from said secondary fractionating zone, withdrawing substantially dry solvent as residual liquid from said tertiary fractionating zone, recycling withdrawn dry solvent to said extraction zone, condensing said secondary and tertiary distillates, subjecting resulting secondary and tertiary condensates in the presence of each other to settling in a secondary settling zone, forming in said secondary settling zone secondary oil-rich, water-rich and solvent-rich liquid layers respectively, separately withdrawing said secondary layers, passing withdrawn secondary oil-rich liquid at least in part to the primary fractionating zone to which the extract phase is charged, passing withdrawn secondary solvent-rich liquid to said tertiary fractionating zone, and passing withdrawn secondary water-rich liquid to both secondary and tertiary fractionating zones.

7. The method according to claim 6 in which said primary oil-rich liquids are at least in part recycled to the primary fractionating zones.

8. The method according to claim 6 in which secondary oil-rich liquid and primary oil-rich liquid are at least in part washed with water to extract residual solvent therefrom, and the resulting extract solution of solvent and water is passed to said secondary settling zone.

9. The method according to claim 6 in which secondary oil-rich liquid and primary oil-rich liquid are washed with water to extract residual solvent therefrom, and the resulting extract solution of solvent and water is passed at least in part to said primary settling zones.

10. The method according to claim 6 in which a portion of the primary solvent-rich liquids is passed to the tertiary fractionating zone, another portion recycled to the extraction zone, and the relative portions correlated so as to maintain a predetermined concentration of water in the solvent in the extraction zone.

11. The method according to claim 6 in which primary oil-rich liquid obtained from both extract and raffinate phases is passed to the primary fractionating zone to which extract phase is charged.

12. The method according to claim 6 in which primary oil-rich liquid obtained from both extract and raffinate phases is passed to the primary fractionating zone to which raffinate phase is charged.

13. The method according to claim 1 in which the extraction is effected in the presence of a small amount of water.

14. The method according to claim 6 in which the extraction is effected in the presence of a small amount of water.

15. The method according to claim 6 in which primary solvent-rich liquid derived from the primary raffinate phase is passed to the tertiary fractionating zone, and primary solvent-rich liquid derived from the primary extract phase is recycled to the extraction zone.

16. In the solvent separation of feed oil containing at least a small proportion of constituents having true boiling points in the range of the solvent boiling temperature and below wherein the feed oil is subjected to contact in an extraction zone with an organic solvent liquid partially miscible with water, extract and raffinate phases are formed, and separately removed from the extraction zone, the steps comprising distilling from at least one of said phases in a primary fractionating zone a distillate of solvent vapor containing small amounts of oil and water and leaving a liquid residue of oil substantially free from solvent, discharging said solvent-free oil, condensing said distillate, subjecting resulting condensate to settling in the presence of water in a primary settling zone, forming in said primary settling zone oil-rich, water-rich and solvent-rich liquid layers respectively, each layer containing minor amounts of the other two components separately withdrawing liquid from each of said primary layers, recycling at least a portion of withdrawn primary water-rich liquid as reflux to said primary fractionating zone in amount sufficient to maintain the top of said primary fractionating zone at a temperature below the boiling temperature of the solvent, recycling at least a portion of withdrawn oil-rich liquid to said primary fractionating zone, passing another portion of withdrawn primary water-rich liquid to a secondary fractionating zone, distilling from said secondary fractionating zone a distillate containing solvent, water and oil, discharging water as a residual fraction from said secondary fractionating zone, substantially completely condensing said secondary distillate, subjecting resulting secondary condensate to settling in a secondary settling zone wherein secondary oil-rich, water-rich and solvent-rich liquid layers are formed, separately withdrawing said secondary liquid layers, passing withdrawn secondary oil-rich liquid at least in part to the primary fractionating zone, recycling withdrawn secondary water-rich liquid at least in part to said secondary fractionating zone, subjecting withdrawn secondary solvent-rich liquid to a further fractionation thereby obtaining a tertiary distillate comprising solvent, oil and water and a residual fraction of solvent substantially free from water, condensing said tertiary distillate and recycling tertiary condensate to said secondary settling zone.

17. In the solvent fractionation of kerosene and light gas oils containing at least a small proportion of constituents having true boiling points in the range of the solvent boiling temperature and below wherein the feed oil is subjected to contact in an extraction zone with a solvent comprising furfural to form extract and raffinate phase mixtures respectively, which mixtures are separately removed from the extraction zone, the steps comprising distilling from at least one of said phase mixtures, in the presence of a substantial amount of water recycled from a succeeding step in the process as later referred to, in a primary fractionating zone a distillate of furfural containing small amounts of oil and water, leaving a liquid residue of oil substantially free from furfural, discharging said furfural-free oil, condensing said distillate, subjecting the resulting condensate to settling in the presence of water in a primary settling zone wherein a plurality of layers are formed comprising a water-rich liquid layer containing small amounts of furfural and oil and a furfural-rich liquid layer containing small amounts of oil and water, separately withdrawing liquid from said liquid layers, recycling a portion of withdrawn water-rich liquid to said primary fractionating zone to supply the aforementioned added water, passing the remaining portion of withdrawn water-rich liquid to a secondary fractionating zone, passing withdrawn solvent-rich liquid to a tertiary fractionating zone, distilling from both said secondary and tertiary fractionating zones, in the presence of added water recycled from a succeeding step as later referred to, distillates containing furfural, water and oil, discharging water as a residual fraction from said secondary fractionating zone, discharging substantially dry solvent as a residual liquid fraction from said tertiary fractionating zone, recycling discharged dry solvent to said extraction zone, condensing said secondary and tertiary distillates, subjecting resulting secondary and tertiary condensates in the presence of each other to settling in a secondary settling zone, forming in said secondary settling zone secondary oil-rich, water-rich and solvent-rich liquid layers respectively, separately withdrawing liquid from said secondary layers, recovering oil from withdrawn secondary oil-rich liquid, passing withdrawn secondary solvent-rich liquid to said tertiary fractionating zone, and passing withdrawn secondary water-rich liquid to both said secondary and tertiary fractionating zones to provide said added water.

JAMES A. DAVIES.

REFERENCES CITED

The following references are of record in the file of this patent:

UNITED STATES PATENTS

| Number | Name | Date |
| --- | --- | --- |
| 2,177,183 | Kraft et al. | Oct. 24, 1939 |
| 2,216,933 | Atkins | Oct. 8, 1940 |
| 2,290,636 | Deanesly | July 21, 1942 |
| 2,381,996 | Bloomer | Aug. 14, 1945 |
| 2,412,823 | Mayland | Dec. 17, 1946 |
| 2,419,039 | Scarth | Apr. 15, 1947 |